US012806834B2

(12) United States Patent
Horimoto et al.

(10) Patent No.: US 12,806,834 B2
(45) Date of Patent: Nov. 24, 2026

(54) SHUT-OFF NOZZLE, INJECTION DEVICE, AND INJECTION MOLDING MACHINE

(71) Applicant: THE JAPAN STEEL WORKS, LTD., Tokyo (JP)

(72) Inventors: Yuya Horimoto, Tokyo (JP); Takafumi Nishibe, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 0 days.

(21) Appl. No.: 18/701,499

(22) PCT Filed: Sep. 2, 2022

(86) PCT No.: PCT/JP2022/033149
§ 371 (c)(1),
(2) Date: Apr. 15, 2024

(87) PCT Pub. No.: WO2023/067916
PCT Pub. Date: Apr. 27, 2023

(65) Prior Publication Data

US 2025/0162220 A1 May 22, 2025

(30) Foreign Application Priority Data

Oct. 22, 2021 (JP) ................................ 2021-173216

(51) Int. Cl.
*B29C 45/23* (2006.01)
*B29C 45/74* (2006.01)
*F16K 5/04* (2006.01)

(52) U.S. Cl.
CPC .............. *B29C 45/23* (2013.01); *B29C 45/74* (2013.01); *F16K 5/0407* (2013.01); *F16K 5/0442* (2013.01)

(58) Field of Classification Search
CPC . F16K 5/18; F16K 5/181; F16K 5/182; F16K 5/184; F16K 5/185; F16K 5/04;
(Continued)

(56) References Cited

U.S. PATENT DOCUMENTS 2,609,174 A * 9/1952 Heinen .................. F16K 5/184
251/163
3,730,161 A * 5/1973 Deane ...................... F01L 7/10
123/190.4

(Continued)

FOREIGN PATENT DOCUMENTS

CN 208854917 U 5/2019
CN 209971345 U 1/2020

(Continued)

OTHER PUBLICATIONS

Form PCT/ISA/237, Oct. 4, 2022.

(Continued)

*Primary Examiner* — Matthew J Daniels
(74) *Attorney, Agent, or Firm* — Potomac Law Group, PLLC

(57) ABSTRACT

A shut-off nozzle includes a nozzle body, a rotary valve, and a reinforcement member. The nozzle body has a nozzle internal flow path formed therein, and a valve insertion hole is opened from a lateral surface of the nozzle body. The rotary valve includes a cylindrical portion to be fitted into the valve insertion hole, and an operation shaft portion having a small diameter. A through hole is opened in the cylindrical portion, and the nozzle internal flow path is opened and closed according to a rotation position of the rotary valve. The reinforcement member includes a cylindrical reinforcement portion to be inserted into the valve insertion hole, and a shaft hole through which the operation shaft portion passes is opened in the cylindrical reinforcement portion. The cylindrical reinforcement portion is
(Continued)

inserted into the valve insertion hole so as to be on an outer side of the cylindrical portion of the rotary valve.

18 Claims, 5 Drawing Sheets

(58) Field of Classification Search
CPC .... F16K 5/0464; F16K 5/0471; F16K 5/0478; F16K 5/0485
See application file for complete search history.

(56) References Cited

U.S. PATENT DOCUMENTS

| | | | | |
|---|---|---|---|---|
| 4,055,324 | A * | 10/1977 | Hughes | F16K 5/04 251/317 |
| 2005/0161847 | A1 * | 7/2005 | Weatherall | B29C 45/77 425/145 |

FOREIGN PATENT DOCUMENTS

| | | | |
|---|---|---|---|
| JP | H02-002114 | U | 1/1990 |
| JP | H05-065518 | U | 8/1993 |
| JP | H09-109203 | A | 4/1997 |
| JP | H09123217 | A | 5/1997 |
| JP | H11-320612 | A | 11/1999 |
| JP | 2012-213993 | A | 11/2012 |
| JP | 2015-231671 | A | 12/2015 |

OTHER PUBLICATIONS

International Search Report for International Patent Application No. PCT/JP2022/033149, Oct. 4, 2022.
Extended European Search Report for European Application No. 22883228.3, Jan. 3, 2025.
Office Action issued Jun. 17, 2026, in Chinese Patent Application No. 202280070294.8.

* cited by examiner

SHUT-OFF NOZZLE, INJECTION DEVICE, AND INJECTION MOLDING MACHINE

TECHNICAL FIELD

The present invention relates to a shut-off nozzle provided in an injection molding machine, an injection device provided with a shut-off nozzle, and an injection molding machine provided with a shut-off nozzle.

BACKGROUND ART

A shut-off nozzle provided in an injection device of an injection molding machine opens and closes a flow path of an injection nozzle through which an injection material flows. By opening and closing the flow path, it is possible to prevent the injection material from leaking (dripping) from a tip end of the injection nozzle, and to prevent the injection material from foaming in the injection nozzle when foam molding is performed.

As the shut-off nozzle, for example, as described in Patent Literature 1, a shut-off nozzle including a rotary valve is known. This type of shut-off nozzle includes a nozzle body and a rotary valve. A valve insertion hole is formed in the nozzle body in a direction perpendicular to a nozzle internal flow path through which an injection material passes, and a cylindrical rotary valve is inserted in the valve insertion hole. The rotary valve has a through hole that penetrates in a diametrical direction of the cylinder. When the rotary valve is rotated, depending on a rotation position, the nozzle internal flow path is closed by a cylindrical surface of the rotary valve, or the nozzle internal flow path is aligned with and communicates with the through hole.

CITATION LIST

Patent Literature

Patent Literature 1: JP2015-231671A

SUMMARY OF INVENTION

Technical Problem

Such a shut-off nozzle in the related art is designed such that fitting is adequate to allow the rotary valve to rotate smoothly relative to the valve insertion hole and to prevent the injection material from leaking through gaps. However, when a nozzle touch is performed to press the shut-off nozzle against a mold, the valve insertion hole is slightly deformed by the pressing force. Due to this deformation, the valve insertion hole and the rotary valve may slightly come into contact with each other (occurrence of galling). If the contact is slight, the rotary valve can be rotated. However, when the operation is performed for a long period of time, wear occurs and the gap between the valve insertion hole and the rotary valve increases. This causes a problem in that injection material leaks.

In view of the above problems, it is an object of the present disclosure to provide a shut-off nozzle capable of preventing an injection material from leaking even after long-term operation, an injection device provided with such a shut-off nozzle, and an injection molding machine.

Other problems and novel features will become apparent from description of the present description and the accompanying drawings.

Solution to Problem

The present inventors have found that the above problems can be solved by adopting the following configurations. That is, the shut-off nozzle includes a nozzle body, a rotary valve, and a reinforcement member. In the nozzle body, a nozzle internal flow path through which an injection material passes is formed in an injection direction, and a valve insertion hole is opened from a lateral surface of the nozzle body. The rotary valve is inserted into the valve insertion hole. The rotary valve includes a cylindrical portion to be fitted into the valve insertion hole and an operation shaft portion having a diameter smaller than that of the cylindrical portion. A through hole is formed in the cylindrical portion, and depending on a rotation position of the rotary valve, the nozzle internal flow path is aligned and communicated with the through hole or the nozzle internal flow path is closed. The reinforcement member includes a cylindrical reinforcement portion to be inserted into the valve insertion hole, and a shaft hole through which the operation shaft portion passes is opened in the cylindrical reinforcement portion. The cylindrical reinforcement portion is inserted into the valve insertion hole adjacent to the cylindrical portion of the rotary valve.

Advantageous Effects of Invention

According to the present disclosure, it is possible to provide a shut-off nozzle that can prevent rotary valve from galling, prevent wear, and prevent an injection material from leaking, an injection device provided with the shut-off nozzle, and an injection molding machine.

DESCRIPTION OF EMBODIMENTS

Figure 1:
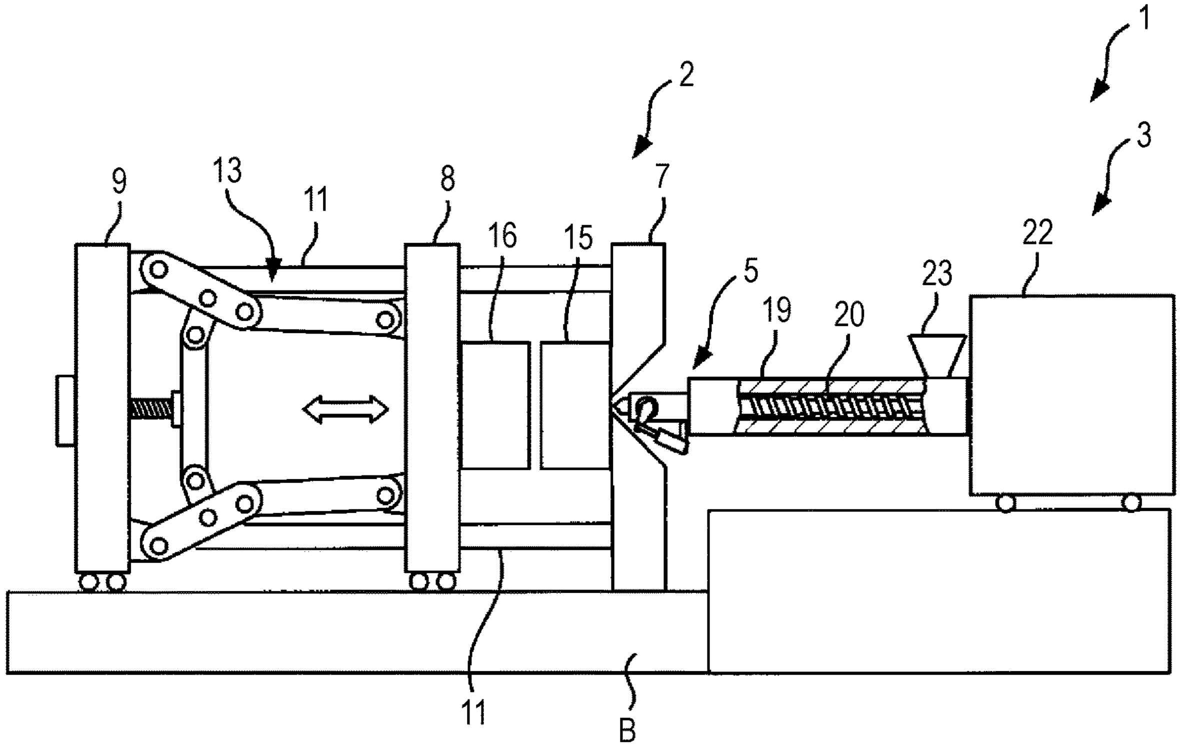
FIG. 1 is a front view showing an injection molding machine according to the present embodiment.

Hereinafter, specific embodiments will be described in detail with reference to the drawings. However, the present invention is not limited to the following embodiment. In order to clarify the description, the following description and the drawings are simplified as appropriate. In the drawings, the same elements are denoted by the same reference numerals, and repeated description thereof is omitted as necessary. In addition, hatching may be omitted to avoid complicating the drawings.

The present embodiment will be described.

A shut-off nozzle according to the present embodiment includes:

a nozzle body in which a nozzle internal flow path through which an injection material passes is formed in an injection direction, and a valve insertion hole is opened from a lateral surface of the nozzle body;

a rotary valve inserted into the valve insertion hole; and a reinforcement member inserted into the valve insertion hole, in which the rotary valve includes:

a cylindrical portion fitted into the valve insertion hole; and an operation shaft portion having a diameter smaller than that of the cylindrical portion, in which when the operation shaft portion is rotated, depending on a rotation position, a through hole opened from a lateral surface of the cylindrical portion is aligned with the nozzle internal flow path, or the nozzle internal flow path is closed, the reinforcement member includes a cylindrical reinforcement portion in which a shaft hole is opened, and the cylindrical reinforcement portion is inserted into the valve insertion hole and is disposed closer to an opening side of the valve insertion hole than the cylindrical portion of the rotary valve, and the operation shaft portion penetrates the shaft hole and is exposed to the outside.

Further, an injection device according to the present embodiment includes: a heating cylinder, a screw provided in the heating cylinder, and the above described shut-off nozzle provided at a tip end of the heating cylinder.

Further, an injection molding machine according to the present embodiment is an injection molding machine including an injection device configured to inject an injection material, and a mold clamping device configured to clamp a mold, in which the injection device is provided with the above described shut-off nozzle.

<Injection Molding Machine>

As shown in FIG. 1, an injection molding machine 1 according to the present embodiment includes a toggle-type mold clamping device 2 and an injection device 3. The injection device 3 according to the present embodiment includes a shut-off nozzle 5 according to the present embodiment described later.

<Mold Clamping Device>

The mold clamping device 2 includes a fixed plate 7, a movable plate 8, and a mold clamping housing 9. The fixed plate 7 is fixed to a bed B. The movable plate 8 is slidably provided on the bed B. The fixed plate 7 and the mold clamping housing 9 are connected by a plurality of tie bars 11, 11, . . . The movable plate 8 is freely slidable between the fixed plate 7 and the mold clamping housing 9. A mold clamping mechanism 13 is provided between the mold clamping housing 9 and the movable plate 8. In the present embodiment, the mold clamping mechanism 13 includes a toggle mechanism. The fixed plate 7 and the movable plate 8 are provided with a fixed side mold 15 and a movable side mold 16, respectively. Accordingly, the molds 15 and 16 are opened and closed when the toggle mechanism is driven.

<Injection Device>

The injection device 3 includes a heating cylinder 19, a screw 20 provided in the heating cylinder 19, and a screw driving device 22. The heating cylinder 19 is supported by the screw driving device 22. The screw 20 is driven by the screw driving device 22 in a rotational direction and an axial direction. The heating cylinder 19 is provided with a hopper 23 and a shut-off nozzle 5 according to the present embodiment, which will be described later. When an injection material is supplied from the hopper 23, the heating cylinder 19 is heated, and the screw 20 is rotated by the screw driving device 22, the injection material is melted and metered. When the screw 20 is driven in the axial direction by the screw driving device 22, the injection material can be injected into the molds 15 and 16.

<Shut-Off Nozzle According to Present Embodiment>

A shut-off nozzle according to the present embodiment includes: a nozzle body, in which a nozzle internal flow path through which an injection material passes is formed in an injection direction, and a valve insertion hole is opened from a lateral surface of the nozzle body; a rotary valve inserted into the valve insertion hole; and a reinforcement member inserted into the valve insertion hole.

The shut-off nozzle 5 according to the present embodiment will be described with reference to FIGS. 2, 3, and 4. The shut-off nozzle 5 according to the present embodiment includes a nozzle body 25, a rotary valve 27, reinforcement members 29, 29 shown in FIGS. 3 and 4, a metal O-ring 31 shown in FIG. 4, and a driving mechanism 30 shown in FIG. 2.

<Nozzle Body>

Figure 2:
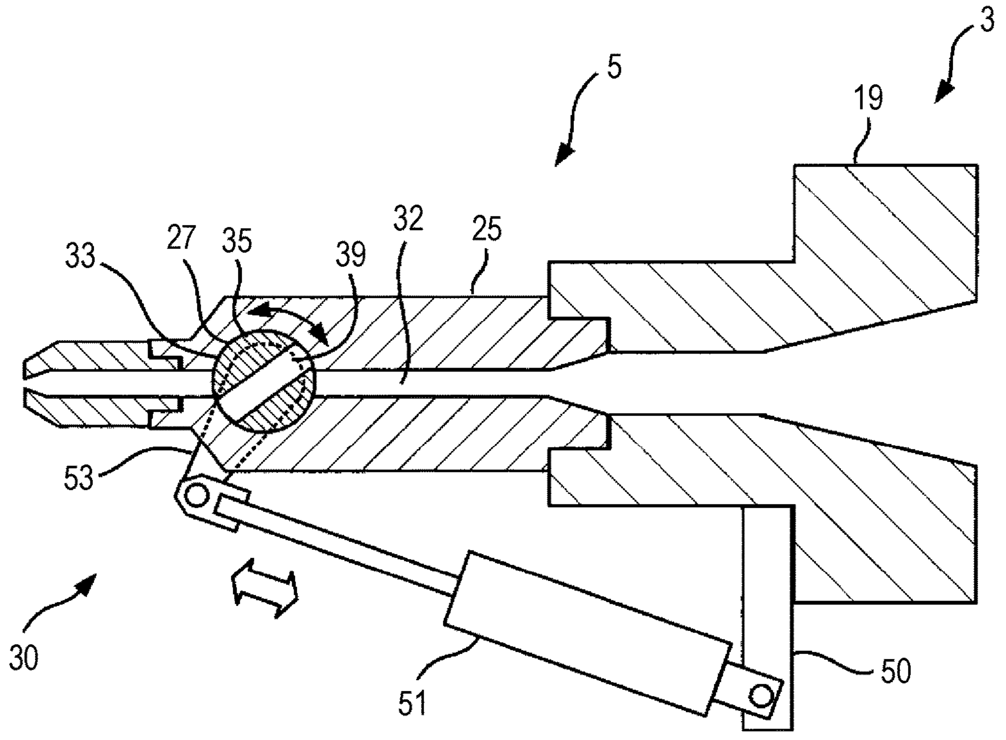
FIG. 2 is a front sectional view showing a shut-off nozzle and a part of an injection device according to the present embodiment.

As shown in FIG. 2, the nozzle body 25 is attached to a tip end of the heating cylinder 19. A nozzle internal flow path 32 through which the injection material flows is formed in the nozzle body 25. The nozzle body 25 has a cylindrical hole penetrating through the nozzle body 25 from a lateral surface thereof, that is, a valve insertion hole 33, which traverses the nozzle internal flow path 32. The rotary valve 27 is inserted into the valve insertion hole 33. Parts of the reinforcement members 29, 29 (see FIGS. 3 and 4) are also inserted into the valve insertion hole 33.

<Rotary Valve>

Figure 3:
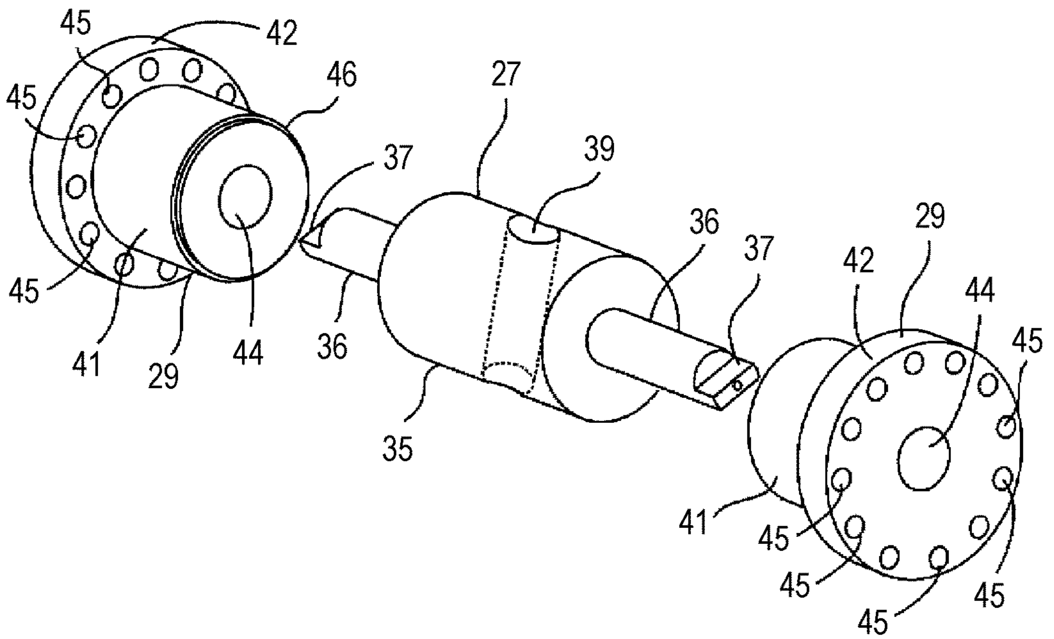
FIG. 3 is a perspective view showing a rotary valve and a reinforcement member configuring the shut-off nozzle according to the present embodiment.
Figure 4:
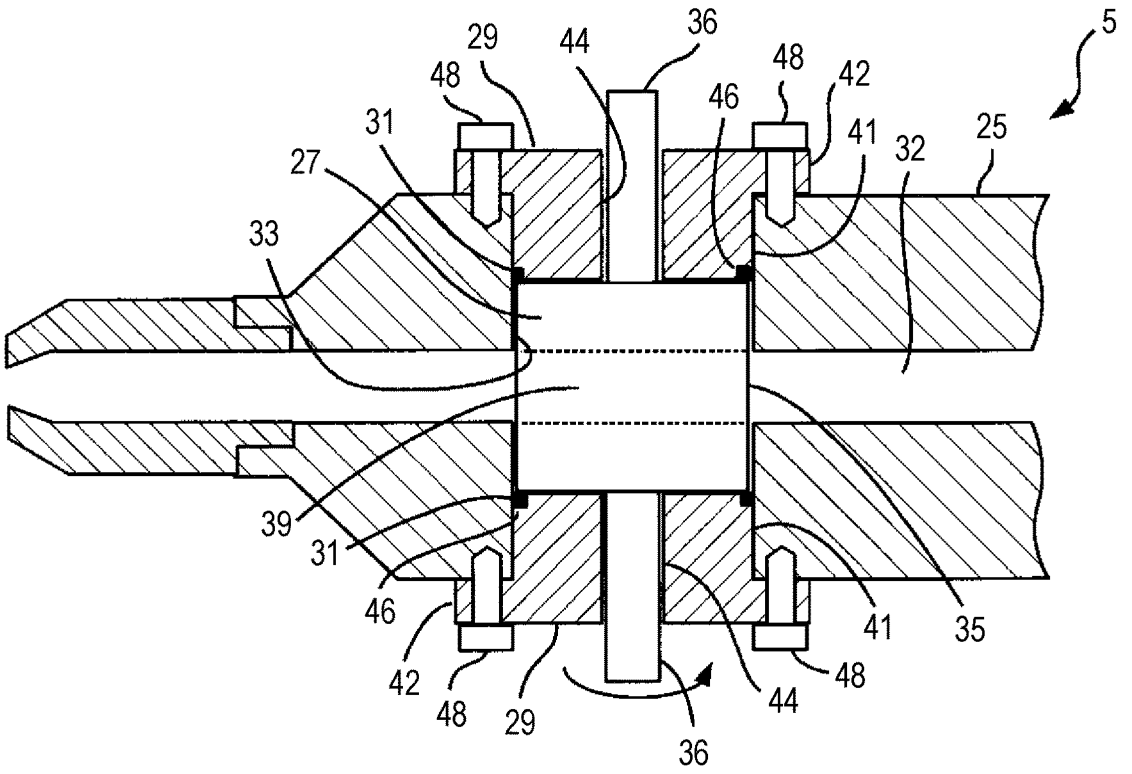
FIG. 4 is a top sectional view showing a part of the shut-off nozzle according to the present embodiment.

As shown in FIG. 3, the rotary valve 27 includes a cylindrical portion 35 and two operation shaft portions 36, 36, which are integrally formed. The cylindrical portion 35 has a diameter slightly smaller than that of the valve insertion hole 33 (see FIG. 2), and smoothly rotates in a state of being inserted into the valve insertion hole 33. The cylindrical portion 35 has a through hole 39 opened in a diametrical direction thereof. As shown in FIG. 2, depending on a rotation position of the rotary valve 27, the nozzle internal flow path 32 and the through hole 39 communicate with each other, or the nozzle internal flow path 32 is closed. As shown in FIG. 3, the two operation shaft portions 36, 36 have a diameter smaller than the cylindrical portion 35, and are formed coaxially with the cylindrical portion 35 outward from both end surfaces of the cylindrical portion 35. Claw portions 37, 37 having cylindrical surfaces cut off from both sides are formed at respective tip ends of the operation shaft portions 36, 36, and are connected to members of the driving mechanism 30, which will be described later.

<Reinforcement Member>

The reinforcement member includes a cylindrical reinforcement portion having a shaft hole. In the present embodiment, an outer diameter of the cylindrical reinforcement portion is preferably larger than an outer diameter of a cylindrical portion of the rotary valve. Preferably, the reinforcement member has a flange portion formed integrally with the cylindrical reinforcement portion, and is fixed to the nozzle body by inserting a bolt into a bolt hole opened in the flange portion.

Further, in the present embodiment, it is preferable that a metal O-ring is provided on a sliding surface on which the cylindrical portion and the cylindrical reinforcement portion slide against each other, and it is more preferable that a circular groove is formed on the sliding surface of the cylindrical reinforcement portion, and a metal O-ring is inserted into the circular groove.

The reinforcement members 29, 29 (see FIGS. 3 and 4) are characteristic members and important members in the present disclosure. Each of the reinforcement members is formed of a cylindrical reinforcement portion 41 having a cylindrical shape and a flange portion 42 integrally formed with the cylindrical reinforcement portion 41. The cylindrical reinforcement portion 41 is configured to be inserted into the valve insertion hole 33 (see FIGS. 2 and 4), and a diameter thereof is slightly larger than the cylindrical portion 35 of the rotary valve 27. Accordingly, the cylindrical reinforcement portions 41 of the reinforcement members 29, 29 fit tighter into the valve insertion hole 33 than the cylindrical portion 35 of the rotary valve 27. The reinforcement members 29, 29 have shaft holes 44, 44 formed coaxially with the cylindrical reinforcement portions 41, 41, and the operation shaft portions 36, 36 of the rotary valve 27 pass through the shaft holes 44, 44. A plurality of bolt holes 45, 45, . . . are opened in each of the flange portions 42, 42 of the reinforcement members 29, 29. A circular groove 46 into which the metal O-ring 31 is to be inserted is formed in each of end surfaces of the cylindrical reinforcement portions 41, 41.

The rotary valve 27 and the reinforcement members 29, 29 are provided in the nozzle body 25 as follows. First, as shown in FIG. 4, the rotary valve 27 is inserted into the valve insertion hole 33 of the nozzle body 25. Subsequently, the metal O-rings 31, 31 are inserted from openings at both ends of the valve insertion hole 33. Next, the reinforcement members 29, 29 are inserted from the openings at both ends of the valve insertion hole 33. The cylindrical portion 35 of the rotary valve 27 is sandwiched by the cylindrical reinforcement portions 41, 41 from both outer sides, and the operation shaft portions 36, 36 penetrate the shaft holes 44, 44 and are exposed to the outside. The reinforcement members 29, 29 are fixed to the nozzle body 25 by a plurality of bolts 48, 48, . . . .

When the rotary valve 27 and the reinforcement members 29, 29 are attached to the nozzle body 25 in this manner, the metal O-rings 31, 31 are sandwiched between the end surfaces of the cylindrical portion 35 and the circular grooves 46 of the cylindrical reinforcement portions 41, 41.

In the present embodiment, an outer diameter of the metal O-ring is preferably equal to or smaller than an inner diameter of the valve insertion hole, and a distance between the metal O-ring and the valve insertion hole is preferably smaller than a distance between the metal O-ring and the shaft hole. In FIG. 4, outer diameters of the metal O-rings 31, 31 are equal to or smaller than an inner diameter of the valve insertion hole 33, and are arranged in the vicinity of the bore of the valve insertion hole 33. Accordingly, even if the injection material enters a gap between the valve insertion hole 33 and the cylindrical portion 35 of the rotary valve 27, leakage to the outside is efficiently prevented by the metal O-rings 31, 31.

<Driving Mechanism>

As shown in FIG. 2, the driving mechanism 30 includes a piston cylinder unit 51 provided on a fixed member 50 fixed to the heating cylinder 19, and a connecting rod 53 driven by the piston cylinder unit 51. The connecting rod 53 is connected to the claw portions 37, 37 of the operation shaft portions 36, 36 (see FIG. 3) of the rotary valve 27. Therefore, when the piston cylinder unit 51 is driven, the rotary valve 27 rotates via the connecting rod 53. As described above, depending on the rotation position of the rotary valve 27, the nozzle internal flow path 32 is closed or communicated through the through hole 39.

As described above with reference to FIGS. 2 to 4, a preferable mode of the shut-off nozzle according to the present embodiment is exemplified in which, the valve insertion hole penetrates the nozzle body, the rotary valve is provided with the operation shaft portions at both ends of the cylindrical portion, and two reinforcement members are provided in the nozzle body with respective cylindrical reinforcement portions sandwiching the cylindrical portion from both sides.

<Operation of Shut-Off Nozzle According to Present Embodiment>

Figure 5:
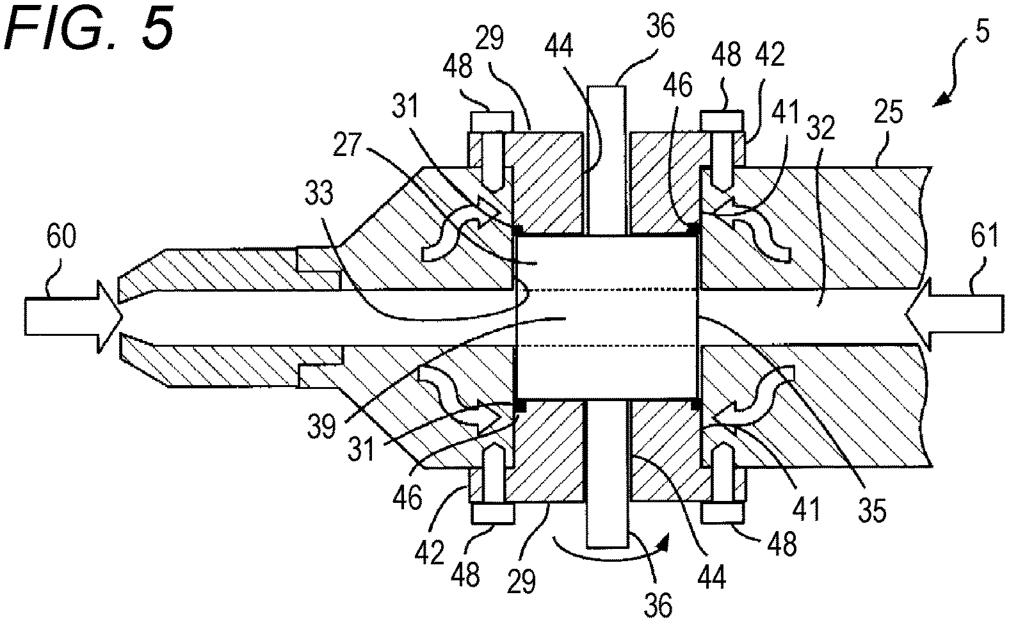
FIG. 5 is a top sectional view showing a part of the shut-off nozzle according to the present embodiment.

The operation of the shut-off nozzle 5 according to the present embodiment will be described. When the shut-off nozzle 5 touches the fixed side mold 15 (see FIG. 1), a touch force 60 (see FIGS. 5 and 6) acts on a tip end of the nozzle body 25 as shown in FIG. 5. Since the nozzle body 25 receives a pressing force 61 from the heating cylinder 19 (see FIG. 1), stress is generated therein. Since the valve insertion hole 33 is opened in the nozzle body 25, stress concentration occurs in the vicinity of the valve insertion hole 33. However, in the present embodiment, the cylindrical reinforcement portions 41, 41 of the reinforcement members 29, 29 are inserted into both sides of the valve insertion hole 33. That is, a part of the valve insertion hole 33 is substantially filled with the cylindrical reinforcement portions 41, 41. As a result, the stress concentration is relaxed. The elastic deformation of the valve insertion hole 33 is small, and no galling occurs between the cylindrical portion 35 of the rotary valve 27 and the valve insertion hole 33.

Figure 6:
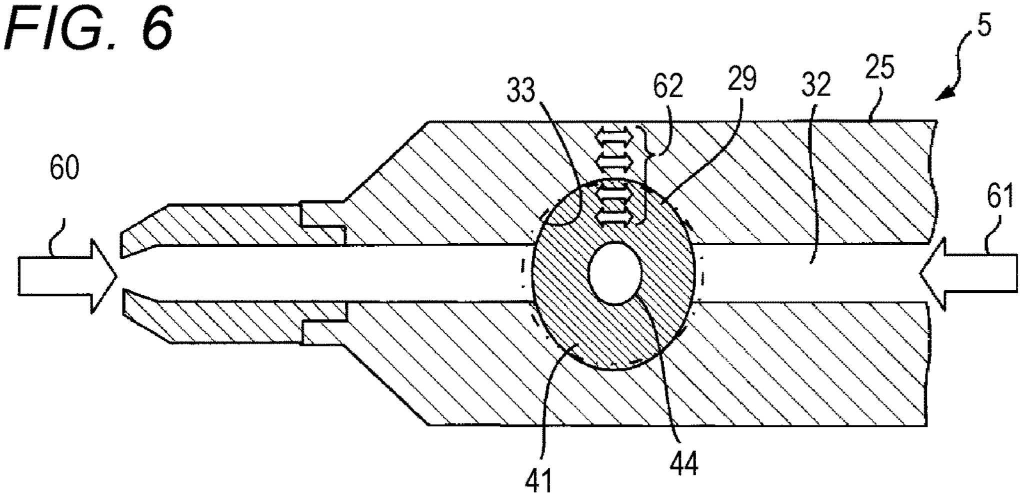
FIG. 6 is a front sectional view showing a part of the shut-off nozzle according to the present embodiment.

The relaxation of the stress concentration will be described with reference to FIG. 6 showing a front cross section of the shut-off nozzle 5. The cylindrical reinforcement portion 41 is inserted into the valve insertion hole 33 with substantially no gap. Therefore, even when stress is generated by the touch force 60 and the pressing force 61, stress 62 in the vicinity of the valve insertion hole 33 is substantially uniformly distributed. The valve insertion hole 33 before being elastically deformed is shown by a dashed line, but since there is almost no stress concentration, elastic deformation of the valve insertion hole 33 and the cylindrical reinforcement portion 41 of the reinforcement member 29 is slight. Since the elastic deformation is thus slight, no galling occurs between the cylindrical portion 35 of the rotary valve 27 and the valve insertion hole 33 as described above. In FIG. 6, the magnitude of elastic deformation is emphasized.

<Related-Art Shut-Off Nozzle>

In order to further understand the operation of the shut-off nozzle 5 according to the present embodiment, a related-art shut-off nozzle 70 will be described with reference to FIGS. 7 and 8. The related-art shut-off nozzle 70 includes a nozzle body 72 in which a nozzle internal flow path 71 is opened, a rotary valve 76 inserted into a valve insertion hole 74 opened in the nozzle body 72, and pressing members 77, 77 that press the rotary valve 76 from both ends. In the related-art shut-off nozzle 70, a length of a cylindrical portion 79 of the rotary valve 76 is equal to a length of the valve insertion hole 74. The rotary valve 76 is configured to smoothly rotate relative to the entire valve insertion hole 74.

Figure 7:
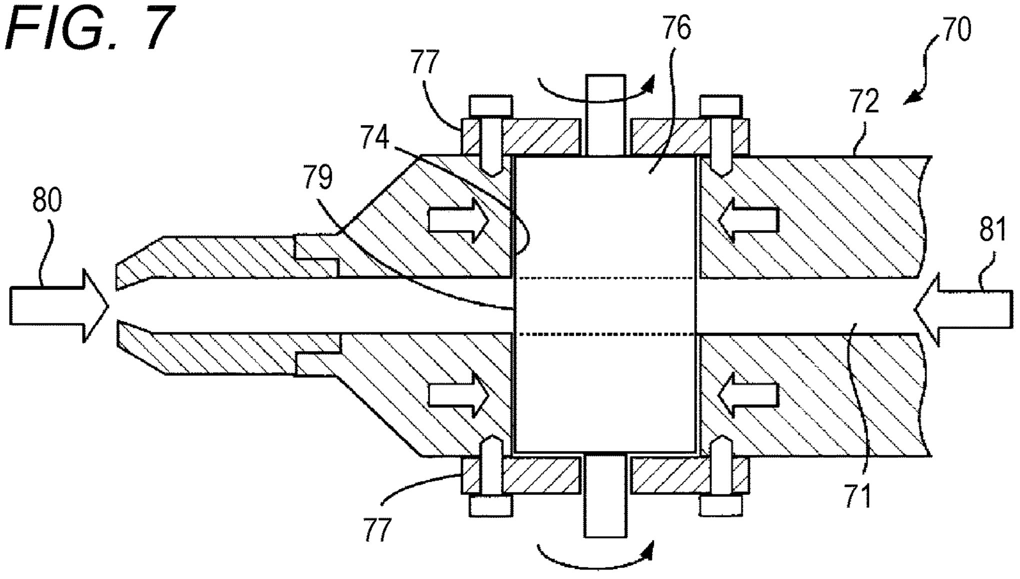
FIG. 7 is a top sectional view showing a part of a related-art shut-off nozzle.
Figure 8:
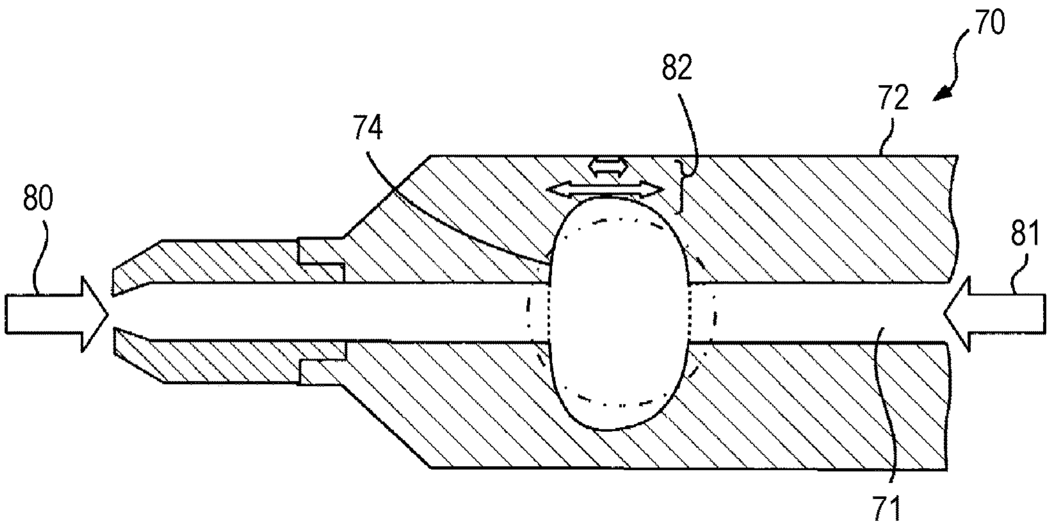
FIG. 8 is a front sectional view showing a part of the related-art shut-off nozzle.

When a touch force 80 and a pressing force 81 act on the related-art shut-off nozzle 70, stress acts uniformly as shown in FIG. 7. Then, stress concentration occurs in the vicinity of the valve insertion hole 74, as shown by stress distribution 82 in FIG. 8. In FIG. 8, the valve insertion hole 74 before deformation is shown by a dashed line, and it can be seen that the valve insertion hole 74 is largely elastically deformed due to the stress concentration. This causes galling to occur between the cylindrical portion 79 of the nozzle body 72 and the valve insertion hole 74.

<Shut-Off Nozzle According to Second Embodiment>

Figure 9:
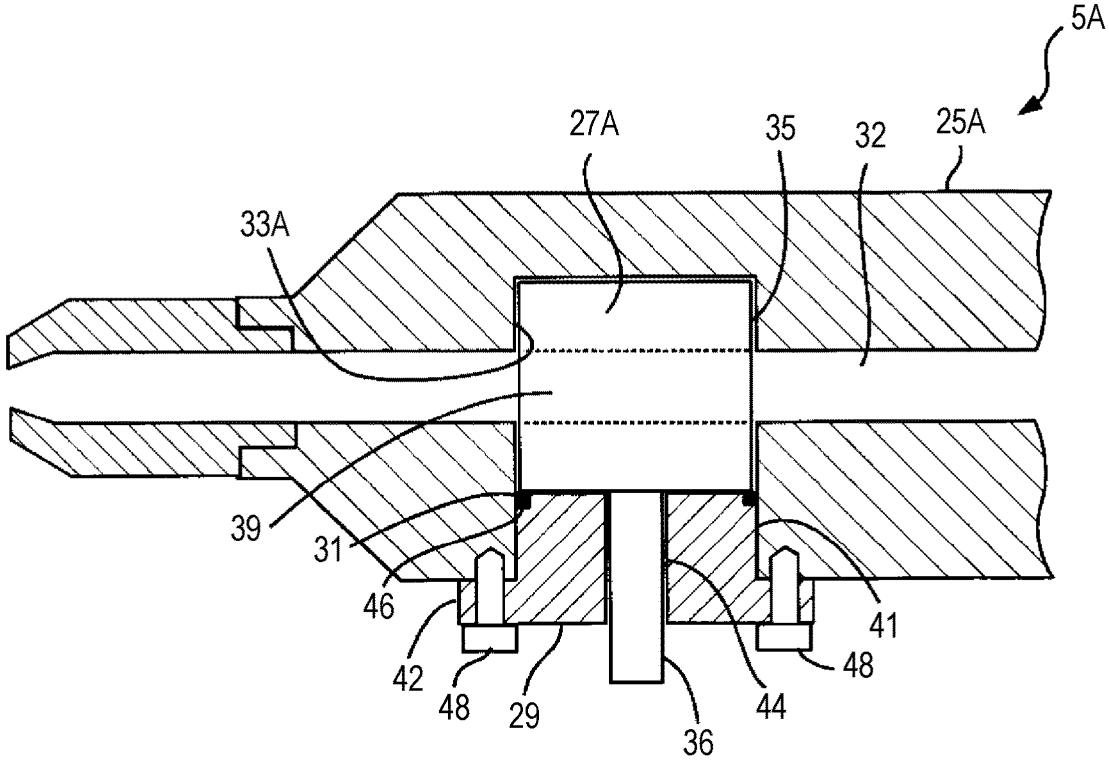
FIG. 9 is a top sectional view showing a part of a shut-off nozzle according to a second embodiment.

The shut-off nozzle 5 according to the present embodiment can be modified in various ways. FIG. 9 shows a modified shut-off nozzle 5A according to the second embodiment. The same members as those of the present embodiment are denoted by the same reference numerals, and description thereof is omitted. In the shut-off nozzle 5A according to the second embodiment, a valve insertion hole 33A opened in a nozzle body 25A is a so-called blind hole. A rotary valve 27A includes the cylindrical portion 35 and one operation shaft portion 36. One reinforcement member 29 and one metal O-ring 31 are provided. In the shut-off nozzle 5A according to the second embodiment, when the touch force acts, stress concentration in the vicinity of the valve insertion hole 33A is prevented, and galling does not occur between the cylindrical portion 35 of the rotary valve 27A and the valve insertion hole 33A.

<Shut-Off Nozzle According to Third Embodiment>

Figure 10:
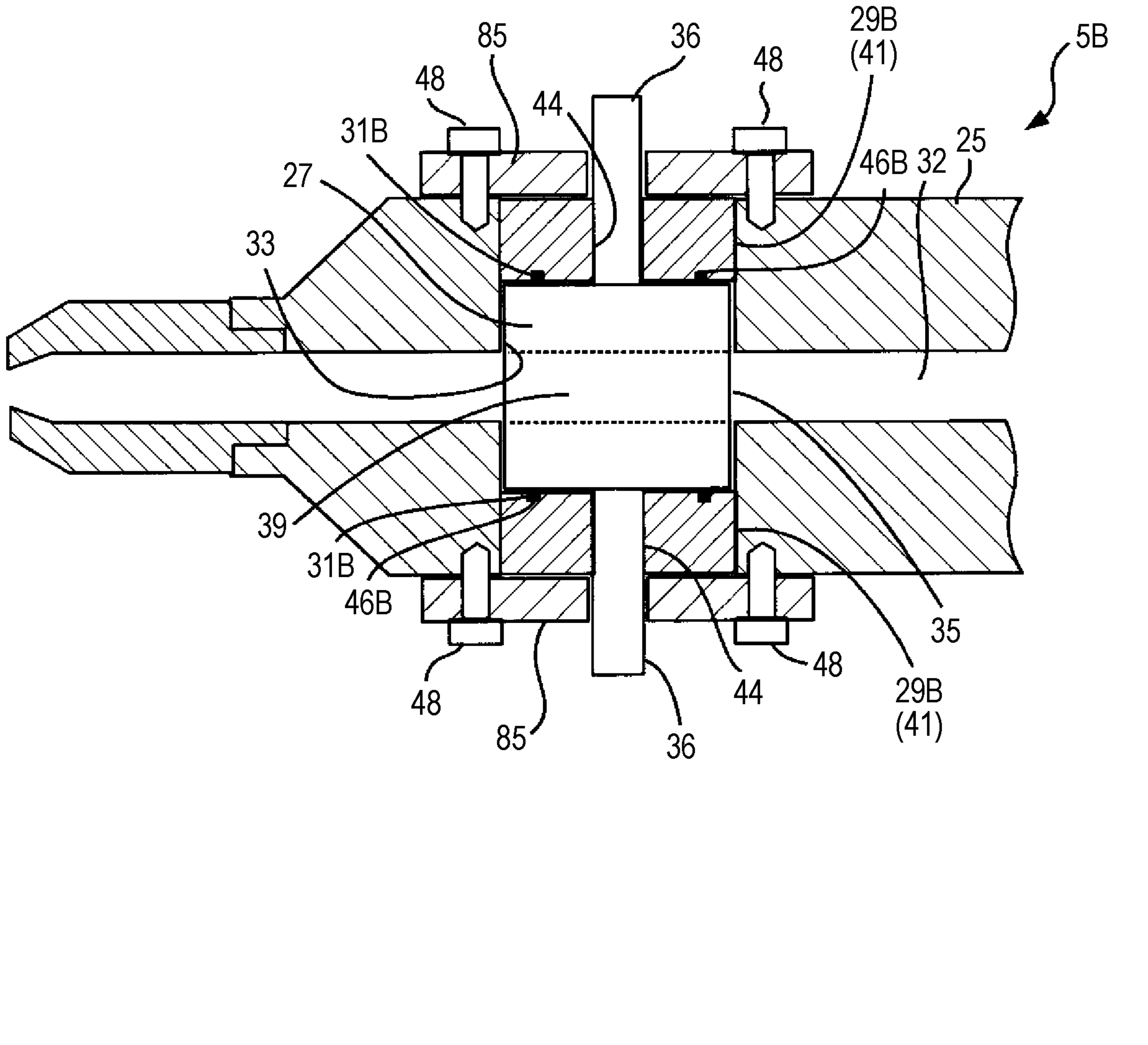
FIG. 10 is a top sectional view showing a part of a shut-off nozzle according to a third embodiment.

FIG. 10 shows a shut-off nozzle 5B according to the third embodiment. In this embodiment, reinforcement members 29B, 29B are modified. A first modification is that the reinforcement members 29B, 29B are formed only of the cylindrical reinforcement portions 41, 41, and are not provided with a flange portion. A second modification is positions and radii of circular grooves 46B, 46B. The diameter is smaller than that of the first embodiment. Accordingly, metal O-rings 31B, 31B to be inserted into the circular grooves 46B, 46B also have small diameters. The reinforcement members 29B, 29B are inserted into the valve insertion hole 33 and fixed by pressing members 85, 85. In the shut-off nozzle 5B according to the third embodiment, when the touch force acts, stress concentration in the vicinity of the valve insertion hole 33 is prevented, and galling does not occur between the cylindrical portion 35 of the rotary valve 27 and the valve insertion hole 33.

Other Modifications

In the description of the present embodiment, the material of each member is not particularly referred to, but it is possible to change mechanical properties by forming the members from different materials. For example, as for the material of the reinforcement member 29, a material harder than the materials of the nozzle body 25 and the rotary valve 27, that is, a material having a larger elastic modulus may be adopted. Thus, the reinforcement member 29 is less likely to be elastically deformed, and the elastic deformation of the valve insertion hole 33 can be further reduced.

Although the invention made by the present inventors is specifically described based on the embodiments, it is needless to say that the present invention is not limited to the embodiments described above, and various modifications can be made without departing from the scope of the invention. The plurality of examples described above may be appropriately combined.

INDUSTRIAL APPLICABILITY

According to the present disclosure, it is possible to provide a shut-off nozzle that can prevent rotary valve from galling, prevent wear, and prevent an injection material from leaking, an injection device provided with the shut-off nozzle, and an injection molding machine.

Although the present invention has been described in detail with reference to specific embodiments, it will be apparent to those skilled in the art that various changes and modifications can be made without departing from the spirit and scope of the present invention. The present application is based on Japanese Patent Application No. 2021-173216 filed on Oct. 22, 2021, and the contents thereof are incorporated herein as reference.

REFERENCE SIGNS LIST

1 Injection molding machine
2 Mold clamping device
3 Injection device
5 Shut-off nozzle
7 Fixed plate
8 Movable plate
9 Mold clamping housing
11 Tie bar
13 Toggle mechanism
15 Fixed side mold
16 Movable side mold
19 Heating cylinder
20 Screw
22 Screw driving device
23 Hopper
25 Nozzle body
27 Rotary valve
29 Reinforcement member
30 Driving mechanism
31 Metal O-ring
32 Nozzle internal flow path
33 Valve insertion hole
35 Cylindrical portion
36 Operation shaft portion
37 Claw portion
39 Through hole
41 Cylindrical reinforcement portion
42 Flange portion
44 Shaft hole
45 Bolt hole
46 Circular groove
48 Bolt
50 Fixed member
51 Piston cylinder unit
53 Connecting rod
60 Touch force
61 Pressing force
62 Stress
B Bed
70 Shut-off nozzle
71 Nozzle internal flow path
72 Nozzle body
74 Valve insertion hole
76 Rotary valve
77 Pressing member
79 Cylindrical portion
80 Touch force
81 Pressing force
82 Stress distribution
5A, 5B Shut-off nozzle
25A Nozzle body
27A Rotary valve
29B Reinforcement member

31B Metal O-ring
33A Valve insertion hole
46B Circular groove
85 Pressing member

The invention claimed is:

1. A shut-off nozzle comprising:

a nozzle body, in which a nozzle internal flow path through which an injection material passes is formed in an injection direction, and a valve insertion hole is opened from a lateral surface of the nozzle body;

a rotary valve inserted into the valve insertion hole; and a reinforcement member inserted into the valve insertion hole, wherein the rotary valve includes:

a unitary cylindrical portion fitted into the valve insertion hole; and an operation shaft portion having a diameter smaller than that of the cylindrical portion, wherein when the operation shaft portion is rotated, depending on a rotation position, a through hole opened from a lateral surface of the cylindrical portion is aligned with the nozzle internal flow path or the nozzle internal flow path is closed, wherein the reinforcement member includes a cylindrical reinforcement portion in which a shaft hole is opened, wherein the cylindrical reinforcement portion is inserted into the valve insertion hole and is disposed closer to an opening side of the valve insertion hole than the cylindrical portion of the rotary valve, and the operation shaft portion penetrates the shaft hole and is exposed to the outside, and wherein an outer diameter of the cylindrical reinforcement portion within the valve insertion hole is larger than an outer diameter of the cylindrical portion, and the cylindrical reinforcement portion is fitted into the valve insertion hole with substantially no gap.

2. The shut-off nozzle according to claim 1, wherein the reinforcement member has a flange portion formed integrally with the cylindrical reinforcement portion, and the reinforcement member is fixed to the nozzle body by inserting a bolt into a bolt hole opened in the flange portion.

3. The shut-off nozzle according to claim 1, wherein the valve insertion hole penetrates the nozzle body, wherein the rotary valve is provided with the operation shaft portions at both ends of the cylindrical portion, and wherein two reinforcement members are provided in the nozzle body with respective cylindrical reinforcement portions sandwiching the cylindrical portion from both sides.

4. The shut-off nozzle according to claim 1, wherein a metal O-ring is provided on a sliding surface on which the cylindrical portion and the cylindrical reinforcement portion slide against each other.

5. The shut-off nozzle according to claim 4, wherein an outer diameter of the metal O-ring is equal to or smaller than an inner diameter of the valve insertion hole, and wherein a distance between the metal O-ring and the valve insertion hole is smaller than a distance between the metal O-ring and the shaft hole.

6. The shut-off nozzle according to claim 4, wherein a circular groove is formed on the sliding surface of the cylindrical reinforcement portion, and the metal O-ring is inserted into the circular groove.

7. An injection device comprising:

a heating cylinder;

a screw provided in the heating cylinder; and a shut-off nozzle provided at a tip end of the heating cylinder, wherein the shut-off nozzle includes:

a nozzle body, in which a nozzle internal flow path though which an injection material passes is formed in an injection direction, and a valve insertion hole is opened from a lateral surface of the nozzle body;

a rotary valve inserted into the valve insertion hole; and a reinforcement member inserted into the valve insertion hole, wherein the rotary valve includes:

a unitary cylindrical portion fitted into the valve insertion hole; and an operation shaft portion having a diameter smaller than that of the cylindrical portion, wherein when the operation shaft portion is rotated, depending on a rotation position, a through hole opened from a lateral surface of the cylindrical portion is aligned with the nozzle internal flow path or the nozzle internal flow path is closed, wherein the reinforcement member includes a cylindrical reinforcement portion in which a shaft hole is opened, wherein the cylindrical reinforcement portion is inserted into the valve insertion hole and is disposed closer to an opening side of the valve insertion hole than the cylindrical portion of the rotary valve, and the operation shaft portion penetrates the shaft hole and is exposed to the outside, and wherein an outer diameter of the cylindrical reinforcement portion within the valve insertion hole is larger than an outer diameter of the cylindrical portion, and the cylindrical reinforcement portion is fitted into the valve insertion hole with substantially no gap.

8. The injection device according to claim 7, wherein the reinforcement member has a flange portion formed integrally with the cylindrical reinforcement portion, and the reinforcement member is fixed to the nozzle body by inserting a bolt into a bolt hole opened in the flange portion.

9. The injection device according to claim 7, wherein the valve insertion hole penetrates the nozzle body, wherein the rotary valve is provided with the operation shaft portions at both ends of the cylindrical portion, and wherein two reinforcement members are provided in the nozzle body with respective cylindrical reinforcement portions sandwiching the cylindrical portion from both sides.

10. The injection device according to claim 7, wherein a metal O-ring is provided on a sliding surface on which the cylindrical portion and the cylindrical reinforcement portion slide against each other.

11. The injection device according to claim 10, wherein an outer diameter of the metal O-ring is equal to or smaller than an inner diameter of the valve insertion hole, and wherein a distance between the metal O-ring and the valve insertion hole is smaller than a distance between the metal O-ring and the shaft hole.

12. The injection device according to claim 10, wherein a circular groove is formed on the sliding surface of the cylindrical reinforcement portion, and the metal O-ring is inserted into the circular groove.

13. An injection molding machine comprising:

an injection device configured to inject an injection material; and a mold clamping device configured to clamp a mold, wherein the injection device includes a shut-off nozzle, wherein the shut-off nozzle includes:

a nozzle body, in which a nozzle internal flow path through which an injection material passes is formed in an injection direction, and a valve insertion hole is opened from a lateral surface of the nozzle body;

a rotary valve inserted into the valve insertion hole; and a reinforcement member inserted into the valve insertion hole, wherein the rotary valve includes:

a unitary cylindrical portion fitted into the valve insertion hole; and an operation shaft portion having a diameter smaller than that of the cylindrical portion, wherein when the operation shaft portion is rotated, depending on a rotation position, a through hole opened from a lateral surface of the cylindrical portion is aligned with the nozzle internal flow path, or the nozzle internal flow path is closed, wherein the reinforcement member includes a cylindrical reinforcement portion in which a shaft hole is opened, wherein the cylindrical reinforcement portion is inserted into the valve insertion hole and is disposed closer to an opening side of the valve insertion hole than the cylindrical portion of the rotary valve, and the operation shaft portion penetrates the shaft hole and is exposed to the outside, and wherein an outer diameter of the cylindrical reinforcement portion within the valve insertion hole is larger than an outer diameter of the cylindrical portion, and the cylindrical reinforcement portion is fitted into the valve insertion hole with substantially no gap.

14. The injection molding machine according to claim 13, wherein the reinforcement member has a flange portion formed integrally with the cylindrical reinforcement portion, and the reinforcement member is fixed to the nozzle body by inserting a bolt into a bolt hole opened in the flange portion.

15. The injection molding machine according to claim 13, wherein the valve insertion hole penetrates the nozzle body, wherein the rotary valve is provided with the operation shaft portions at both ends of the cylindrical portion, and wherein two reinforcement members are provided in the nozzle body with respective cylindrical reinforcement portions sandwiching the cylindrical portion from both sides.

16. The injection molding machine according to claim 13, wherein a metal O-ring is provided on a sliding surface on which the cylindrical portion and the cylindrical reinforcement portion slide against each other.

17. The injection molding machine according to claim 16, wherein an outer diameter of the metal O-ring is equal to or smaller than an inner diameter of the valve insertion hole, and wherein a distance between the metal O-ring and the valve insertion hole is smaller than a distance between the metal O-ring and the shaft hole.

18. The injection molding machine according to claim 16, wherein a circular groove is formed on the sliding surface of the cylindrical reinforcement portion, and the metal O-ring is inserted into the circular groove.

* * * * *